(12) United States Patent
Kopp

(10) Patent No.: US 6,979,404 B2
(45) Date of Patent: Dec. 27, 2005

(54) SELF-MANIFOLDING SHEET MEMBRANE MODULE

(75) Inventor: Clint Kopp, Bismarck, ND (US)

(73) Assignee: Triple I, Bismarck, ND (US)

( * ) Notice: Subject to any disclaimer, the term of this patent is extended or adjusted under 35 U.S.C. 154(b) by 116 days.

(21) Appl. No.: 10/322,908

(22) Filed: Dec. 18, 2002

(65) Prior Publication Data

US 2003/0121855 A1  Jul. 3, 2003

Related U.S. Application Data

(60) Provisional application No. 60/345,296, filed on Jan. 2, 2002.

(51) Int. Cl.$^7$ .............................................. B01D 65/02
(52) U.S. Cl. ............ 210/636; 210/321.69; 210/321.89; 210/650
(58) Field of Search .................. 210/321.69, 321.88, 210/321.89, 332, 333.01, 615, 617, 636, 210/650, 791

(56) References Cited

U.S. PATENT DOCUMENTS

| | | | |
|---|---|---|---|
| 2,551,312 A | | 5/1951 | Bokich |
| 3,580,840 A | * | 5/1971 | Uridil ......................... 210/611 |
| 4,549,963 A | | 10/1985 | Jensen et al. |
| 4,597,868 A | | 7/1986 | Watanabe |
| 4,600,511 A | | 7/1986 | Sherman et al. |
| 5,002,667 A | | 3/1991 | Kutowy et al. |
| 5,049,271 A | | 9/1991 | Cain |
| 5,076,923 A | | 12/1991 | Hilgendorff et al. |
| 5,209,852 A | * | 5/1993 | Sunaoka et al. ............ 210/636 |
| 5,401,403 A | | 3/1995 | Hagqvist |
| 5,482,625 A | | 1/1996 | Shimizu et al. |
| 5,910,250 A | * | 6/1999 | Mahendran et al. ........ 210/636 |

(Continued)

FOREIGN PATENT DOCUMENTS

| | | |
|---|---|---|
| EP | 1 254 691 A1 | 11/2002 |
| JP | 7-289856 | 11/1995 |
| JP | 1996131783 A | 5/1996 |
| JP | 11-347375 | 12/1999 |
| JP | 2000-79331 | 3/2000 |
| JP | 2000-210660 | 8/2000 |
| JP | 2001-009246 | 1/2001 |

OTHER PUBLICATIONS

Patent Abstracts of Japan: Publication No. 2001334134, Publication Date Dec. 4, 2001.

(Continued)

*Primary Examiner*—Joseph Drodge
(74) *Attorney, Agent, or Firm*—Leffert Jay & Polglaze, PA

(57) ABSTRACT

A filtration device having a plurality of membrane modules is provided. Each of the plurality of membrane modules has first and second permeable sheets that are separated by a spacer, a first ring disposed around a perimeter of a first hole in the first permeable sheet, and a second ring disposed around a perimeter of a second hole in the second permeable sheet, the second hole in alignment with the first hole. The first ring of each of the plurality of membrane modules is in abutment with the second ring of a preceding one of each of the plurality of membrane modules so that the plurality of membrane modules are interconnected for communication therebetween. Some embodiments further provide a third sheet that disposed between successively adjacent membrane modules.

6 Claims, 8 Drawing Sheets

U.S. PATENT DOCUMENTS

| | | | |
|---|---|---|---|
| 6,033,566 A | | 3/2000 | Averill et al. |
| 6,126,819 A | * | 10/2000 | Heine et al. .................. 210/139 |
| 6,280,626 B1 | * | 8/2001 | Miyashita et al. ........... 210/636 |
| 6,312,598 B1 | | 11/2001 | Munson et al. |
| 6,371,307 B1 | | 4/2002 | Eskes |
| 6,375,848 B1 | * | 4/2002 | Cote et al. ................... 210/650 |
| 6,451,205 B1 | | 9/2002 | McGaw, Jr. |
| 6,461,524 B1 | | 10/2002 | Tsuihiji et al. |
| 6,555,005 B1 | * | 4/2003 | Zha et al. .................... 210/636 |

OTHER PUBLICATIONS

Patent Abstracts of Japan: Publication No. 08155277, Publication Date Jun. 18, 1996.

Patent Abstracts of Japan: Publication No. 08155278, Publication Date Jun. 18, 1996.

Patent Abstracts of Japan: Publication No. 10128082, Publication Date May 19, 1998.

* cited by examiner

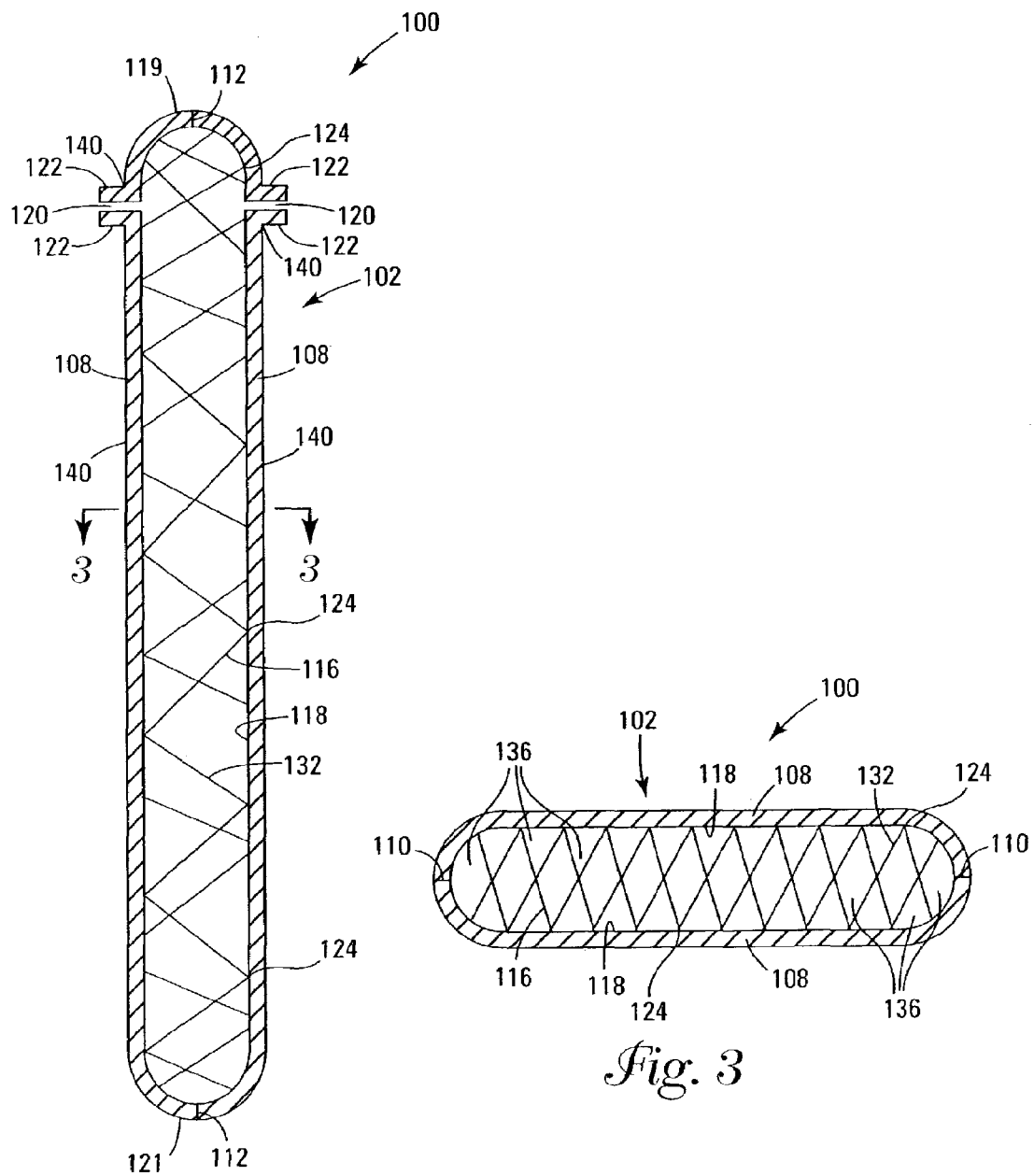

SELF-MANIFOLDING SHEET MEMBRANE MODULE

CROSS REFERENCE TO RELATED APPLICATIONS

This application is related to and claims the benefit of the filing date of now abandoned provisional application U.S. Ser. No. 60/345,296, filed on Jan. 2, 2002, which application is incorporated herein by reference.

TECHNICAL FIELD

The present invention relates generally to the field of filtration and, in particular, to self-manifolding sheet membrane modules.

BACKGROUND

Filtration units are typically employed in liquid, e.g., water, waste, etc., treatment plants for purifying the liquid. This involves filtering particles, e.g., micron, submicron, etc., from the liquid to produce a filtered liquid (or filtrate). Many filtration units use bundles of hollow-fiber membranes, e.g., small diameter tubes having permeable walls, for filtering. In some applications, the bundles are immersed in the liquid to be filtered and filtrate passes through the permeable walls and into the tubes under a pressure gradient. One problem with using bundles of hollow-fiber membranes is that hollow-fiber membranes are expensive.

Some filtration units use a number of sheet membrane modules for filtering. Typically, each sheet membrane module includes a pair of sheet membranes separated by a flow passage. The sheet membrane modules are usually immersed in the liquid to be filtered and filtrate passes through the pair of sheet membranes of each sheet membrane module and into the flow passage under a pressure gradient. Most of these filtration units are constructed by potting several of sheet membranes within a container using, for example, a liquefied thermoplastic, such as polyurethane. However, this is expensive owing to the large amounts of potting material that is typically required.

For the reasons stated above, and for other reasons stated below that will become apparent to those skilled in the art upon reading and understanding the present specification, there is a need in the art for alternative filtration devices.

SUMMARY

One embodiment of the present invention provides a filtration device. The filtration device has a self-supporting membrane module suspendable within a fluid environment. The membrane module includes an envelope having a pair of permeable sheets that form a permeable boundary of the envelope. A spacer is disposed between the pair of permeable sheets. Each of the pair of permeable sheets has a hole passing therethrough. The hole of one of the sheets is aligned with the hole of the other sheet.

Another embodiment provides a filtration device having a plurality of membrane modules. Each of the plurality of membrane modules has first and second permeable sheets that are separated by a spacer, a first ring disposed around a perimeter of a first hole in the first permeable sheet, and a second ring disposed around a perimeter of a second hole in the second permeable sheet, the second hole in alignment with the first hole. The first ring of each of the plurality of membrane modules is in abutment with the second ring of a preceding one of each of the plurality of membrane modules so that the plurality of membrane modules are interconnected for communication therebetween. Some embodiments further provide a third sheet that disposed between successively adjacent membrane modules.

BRIEF DESCRIPTION OF THE DRAWINGS

FIG. 2 is a view taken along line 2—2 of FIG. 1.

FIG. 3 is a view taken along line 3—3 of FIG. 2.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1:
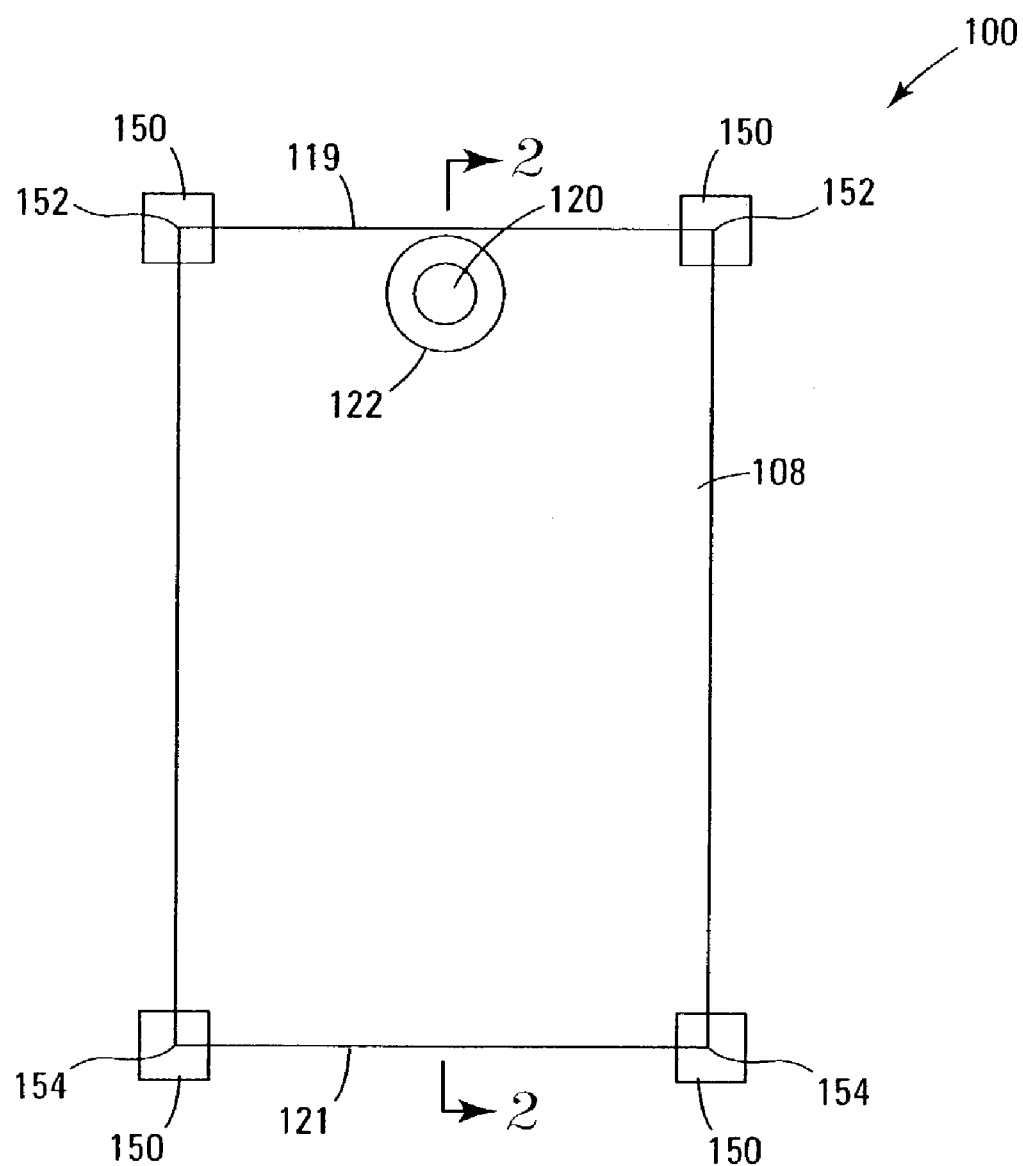
FIG. 1 is a front view of an embodiment of a membrane module according to the teachings of the present invention.

FIGS. 1–3 illustrate an embodiment of a membrane module 100 according to the teachings of the present invention. Membrane module 100 includes an envelope 102. Envelope 102 includes a pair of permeable sheets 108, e.g., sheet membranes, that are substantially parallel to each other and that form a permeable boundary of envelope 102. A flexible spacer 116 is disposed between permeable sheets 108 and is fixedly attached to each of permeable sheets 108. However, the present invention is not limited to a flexible spacer. Rather, in some embodiments, a substantially rigid spacer is used in place of flexible spacer 116. Moreover, the present invention is not limited to a spacer that is fixedly attached to each of permeable sheets 108. Instead, in one embodiment, the spacer can be movably attached to each of permeable sheets 108 or can be free of any attachment to each of permeable sheets 108. Each of permeable sheets 108 has a hole 120 passing therethrough, such that hole 120 of one of permeable sheets 108 is aligned with the hole 120 of the other of permeable sheets 108, as shown in FIG. 2.

In one embodiment, a single pair of aligned holes 120 are adjacent an edge 119 of membrane module 100, as shown in FIGS. 1 and 2. A single pair of aligned holes 120 simplifies the manufacture of membrane 100 and thus reduces the cost of membrane 102. A single pair of aligned holes 120 enables the use of a single manifold for connecting a series of membrane modules 100 together. Advantages of a single manifold are discussed below. However, membrane module 100 is not limited to a single pair of aligned holes 120, and in other embodiments, membrane module 100 includes multiple pairs of aligned holes 120, e.g., adjacent an edge 121 membrane module 100, centered between edges 119 and 121, etc.

In one embodiment, a ring 122 is disposed around a perimeter of hole 120 of each of permeable sheets 108. Rings 122 provide a self-manifolding feature that enables a number of membrane modules 100 to be connected together via rings 122. This eliminates the need for potting a number of sheet membranes within a container. In other embodiments, a number of membrane modules 100 are connected together without rings 122. In these embodiments, adjacent membranes are directly attached so that holes 120 of adjacent membranes are aligned. This also provides a self-manifolding feature, Disposing flexible spacer 116 between permeable sheets 108 and fixedly attaching flexible spacer 116 to each of permeable sheets 108 enables membrane module 100 to be self-supporting. This enables a pressure gradient to be applied across permeable sheets 108 without substantially deflecting permeable sheets 108. That is, fixedly attaching flexible spacer 116 to each of permeable sheets 108 causes membrane module 100 to be substantially rigid.

In one embodiment, permeable sheets 108 are attached to each other at their edges 110 and 112 by a suitable method, such as gluing, hotplate welding, ultrasonic welding, or the like. In another embodiment, permeable sheets 108 are integral. In this embodiment, the integral permeable sheets 108 are folded, e.g., at edge 121. In other embodiments, ring 122 is secured to an exterior surface 140 of each of permeable sheets 108 by gluing or the like. In some embodiments, permeable sheets 108 are of polysulfone, polyethersulfone, polyethylene, nano-filter membranes, reverse osmosis membranes, or the like. In one embodiment, permeable sheets 108 include both permeable and non-permeable materials.

Flexible spacer 116 is fixedly attached to each of permeable sheets 108 at an interior surface 118 of each of permeable sheets 108, e.g., by gluing or the like. To maintain sufficient permeability of permeable sheets 108 for ensuring adequate filtration performance, flexible spacer 116 is adhered to each of permeable sheets 108 at discrete locations of interior surface 118, e.g., locations 124. In one embodiment, this is accomplished by applying an adhesive to discrete portions of interior surface 118 of each of permeable sheets 108, e.g., at random.

In various embodiments, flexible spacer 116 includes members 132. In some embodiments, members 132 are of polyester, polypropylene, or any material that is hydrolytically stable, resistant to chlorine oxidation, etc. In one embodiment, members 132 are distributed to provide a mesh having a number of passageways 136 (e.g., interstices of the mesh) between them that collectively define a flow passage between permeable sheets 108 and thus within envelope 102 of membrane module 100. The mesh supports permeable sheets 108 so as to prevent sheets 108 from being compressed together or pulled apart, for example, by pressures encountered by membrane 100 during operation.

In operation, membrane module 100 is disposed in a fluid environment, e.g., water, sewage, or the like, so that the fluid wets exterior surface 140 of each of permeable sheets 108. A pressure gradient is applied across each of permeable sheets 108 such that the pressure within the fluid environment is greater than within envelope 102, e.g., by pumping up the pressure of the fluid environment or applying suction at either of holes 120. This causes liquid filtrate, filtered water, sewage or the like, to flow through each of permeable sheets 108 and into envelope 102 of membrane module 100. The filtrate flows through passageways 136, in one embodiment, and exits membrane module 100 via one or both of holes 120. In another embodiment, the pressure gradient is reversed such that the pressure within envelope 102 is greater than the within the fluid environment, causing the fluid within membrane module 100 to flow through each of permeable sheets 108 and into the fluid environment, for example, for backwashing membrane module 100. In some embodiments, backwashing is performed while cleaning exterior surfaces 140. In various embodiments, fibers 132 are distributed so that the pressure drop along the length of envelope 102 is small relative to the pressure gradient across each of permeable sheets 108.

Figure 4A:
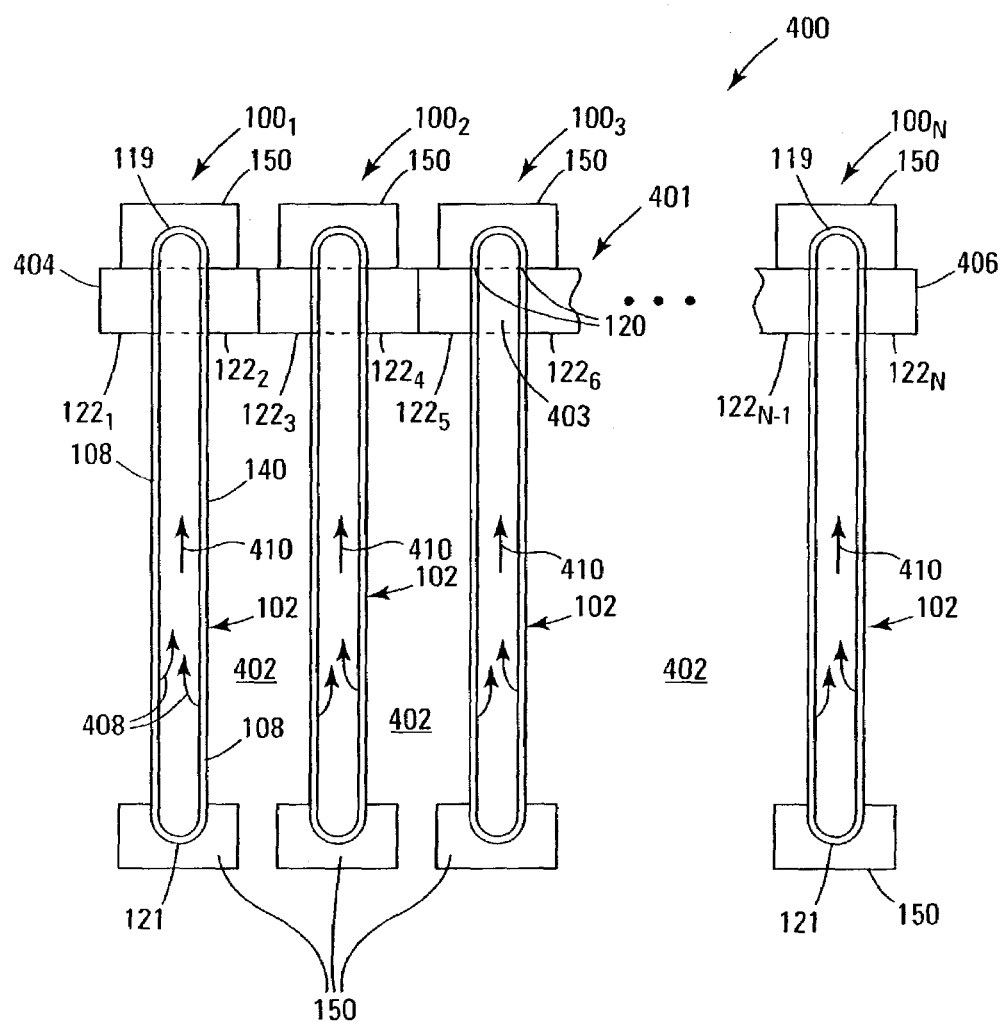
FIG. 4a illustrates an embodiment of a filtration apparatus according to the teachings of the present invention.

FIG. 4a illustrates another embodiment of a filtration apparatus 400 according to the teachings of the present invention. Elements of FIG. 4a that are common to FIGS. 1–3 are numbered as in FIGS. 1–3 and are as described above. Filtration apparatus 400 includes a plurality of membrane modules $100_1$ to $100_N$, such as membrane module 100. In one embodiment, membrane modules $100_1$ to $100_N$ are successively adjacent and substantially parallel to each other. Adjacent rings 122 respectively of adjacent membrane modules 100 abut to interconnect adjacent membrane modules 100 for communication therebetween. For example, as shown in FIG. 4a, adjacent rings $122_2$ and $122_3$ respectively of adjacent membrane modules $100_1$ and $100_2$ abut to interconnect adjacent membrane modules $100_1$ and $100_2$, adjacent rings $122_4$ and $122_5$ respectively of adjacent membrane modules $100_2$ and $100_3$ abut to interconnect adjacent membrane modules $100_2$ and $100_3$, etc. This forms a manifold 401 for collecting filtrate that flows within each of envelopes 102 of each of membrane modules 100, respectively, as indicated by arrows 410.

In one embodiment, a single manifold 401 is adjacent edge 119 of each of membrane modules 100 and thus membrane modules 100 are interconnected adjacent edge 119 only. A single manifold 401 simplifies assembly of filtration apparatus 400, installation of filtration apparatus 400 in fluid containment apparatus, and maintenance procedures, e.g., replacing on or more membrane modules 100. In another embodiment, a bore 403 passes through flexible spacer 116 of each of membrane modules 100 and interconnects holes 120, thereby forming a portion of manifold 401, as shown in FIG. 4. Filtration apparatus 400 is not limited to a single manifold 401, and for other embodiments, filtration apparatus 400 includes multiple manifolds 401 so that membrane modules 100 are also interconnected at other locations, e.g., adjacent edge 121 membrane modules 100, centered between edges 119 and 121, etc.

For another embodiment, successively adjacent membrane modules 100 are connected together by aligning holes 120 of the adjacent membrane modules 100 and attaching the adjacent membrane modules 100 together directly by attaching the region around the perimeters of the holes 120 of adjacent membranes together, e.g., by gluing or the like. In this embodiment, bore 403 of each membrane module 100 forms manifold 401. Adding additional membrane modules 100 adds to manifold 401, and therefore this embodiment is also self-manifolding.

In one embodiment, adjacent rings 122 respectively of adjacent membrane modules 100 are maintained in abutment by a compressive force applied across the plurality of membrane modules 100, e.g., by clamping or the like. In other embodiments, the abutment between adjacent rings 122 respectively of adjacent membrane modules 100 is sealed, such as by an "O" ring disposed between the adjacent rings 122, a seal integral with a face of one of the adjacent rings 122, or any other suitable sealing arrangement known by those skilled in the art.

Figure 4B:
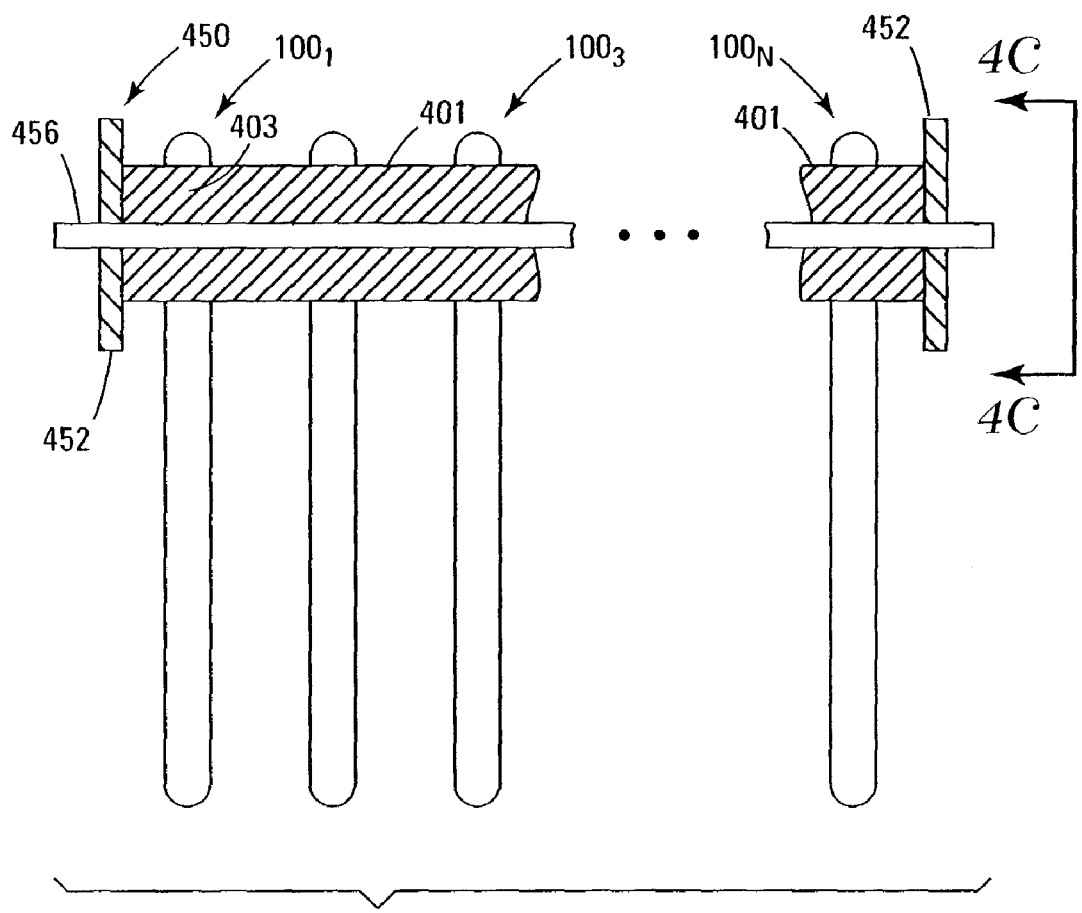
FIG. 4b is a cross-sectional view illustrating clamping of the filtration apparatus of FIG. 4a according to another embodiment of the present invention.
Figure 4C:
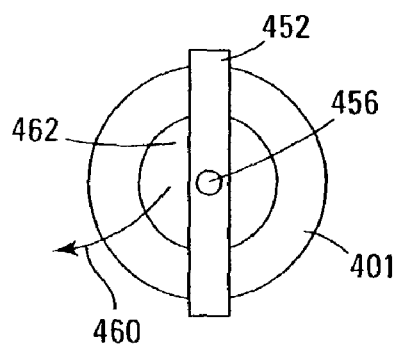
FIG. 4c is a view taken along line 4c—4c of FIG. 4b.

In another embodiment, a clamp 450 applies the compressive force, as shown in FIGS. 4b and 4c. In particular, for one embodiment, clamp 450 includes jaws 452 disposed on a rod 456, where membrane modules 100 are sandwiched between jaws 452. For one embodiment, rod 456 passes through manifold 401 and the bore 403 that passes through each of membrane modules 100. For another embodiment, at least one of jaws 452 is selectively movable relative to rod 456. FIG. 4c shows that during clamping, each of jaws 452 engages manifold 401 so as to provide a flow passage 462 for fluid pass through, as indicated by arrow 460.

To remove one or more of membrane modules $100_1$ to $100_N$, e.g., membrane module $100_2$, from filtration apparatus 400, the compressive force across membrane modules $100_1$ to $100_N$ is removed. Rings $122_3$ and $122_4$ of membrane module $100_2$ are respectively separated from rings $122_2$ and $122_5$ respectively of the adjacent membrane modules $100_1$ and $100_3$. This enables membrane module $100_2$ to be removed from filtration apparatus 400. In this manner, any one of the individual membrane modules may be removed from filtration apparatus 400.

In one embodiment, hangers 150 are attached to each of membrane modules 100 at corners 152 and 154, as shown in FIG. 1. In one embodiment, hangers 150 are attached only at corners 152. Hangers 150 are used, in one embodiment, to suspend each of membrane modules 100 and thus filtration apparatus 400 within a fluid containment apparatus, such as a tank, a flow channel, or the like, from a supportive structure, such as a frame, adjacent or integral to the fluid containment apparatus. Hangers 150 are adapted to be removable from the supportive structure to facilitate the independent removal of each of membrane modules 100 from the supportive structure, e.g., for maintenance, replacement, or the like. In various embodiments, hangers 150 are rendered removable by configuring hangers 150 as clamps that selectively clamp to the supportive structure, hooks, ties, or using other methods known to those skilled in the art.

To remove membrane module $100_2$, for example, from filtration apparatus 400 for embodiments where filtration apparatus 400 is suspended within the fluid containment apparatus, rings $122_3$ and $122_4$ of membrane module $100_2$ are respectively separated from rings $122_2$ and $122_5$ while the hangers 150 of membrane module $100_2$ suspend membrane module $100_2$ within the fluid containment apparatus. Then, the hangers 150 of the membrane module $100_2$ are removed from the supportive structure, and membrane module $100_2$ is removed from filtration apparatus 400 and the tank, while filtration apparatus 400 less membrane module $100_2$ remains suspended within the tank.

To install membrane module $100_2$ in filtration apparatus 400 after removing membrane module $100_2$, as described above, membrane module $100_2$ is inserted between membrane modules $100_1$ and $100_3$. In one embodiment, membrane module $100_2$ is inserted between membrane modules $100_1$ and $100_3$ while filtration apparatus 400 is suspended in the fluid containment apparatus. In this embodiment, hangers 150 of membrane module $100_2$ are attached to the supportive structure to suspend membrane module $100_2$ within the fluid containment apparatus. Rings $122_3$ and $122_4$ of membrane module $100_2$ are respectively aligned with rings $122_2$ and $122_5$ respectively of membrane modules $100_1$ and $100_3$. The compressive force is applied across membrane modules $100_1$ to $100_N$ to respectively abut rings $122_2$ and $122_5$ against rings $122_3$ and $122_4$.

In operation, filtration apparatus 400 is disposed within a fluid containment apparatus as described above so that a fluid, such as water, sewage, or the like, resides in each of regions 402 between envelopes 102 of adjacent membrane modules 100, as shown in FIG. 4a. A pressure gradient is applied across each of permeable sheets 108 of each of envelopes 102, for example, by pumping up the pressure of the fluid in the fluid containment apparatus or applying suction at an opening 404 of manifold 401 and/or an opening 406 of manifold 401. This causes liquid filtrate, e.g., filtered water, sewage, or the like, to pass through each of permeable sheets 108 of each of membrane modules 100 and into envelope 102 of each of membrane modules 100, as illustrated by arrows 408 of FIG. 4a. The filtrate passes within each of envelopes 102, as illustrated by arrow 410, and into manifold 401. The filtrate exits filtration apparatus 400 via opening 404 and/or opening 406 of manifold 401. During backwashing, the pressure gradient is reversed, thus causing the direction of arrows 408 and 410 to be reversed.

Figure 5:
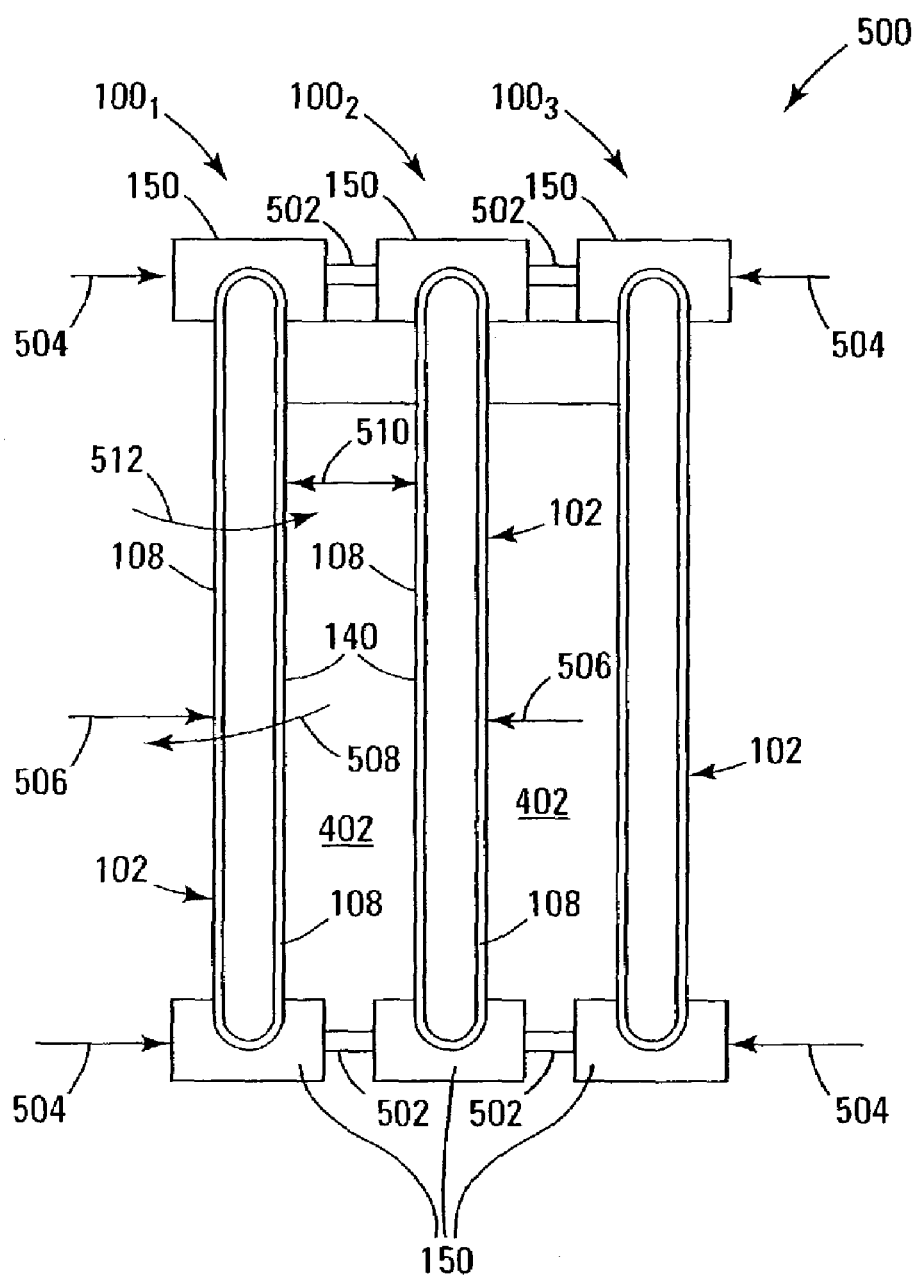
FIG. 5 illustrates another embodiment of a filtration apparatus according to the teachings of the present invention.

FIG. 5 illustrates another embodiment of a filtration apparatus 500 according to the teachings of the present invention. Elements in FIG. 5 that are common to FIGS. 1–4 are numbered as in FIGS. 1–4 and are as described above. Resilient spacers 502 are disposed between adjacent hangers 150, as shown in FIG. 5. Resilient spacers 502 are alternately compressed and released, for example, by alternately applying a compressive force (indicated by arrows 504) to hangers 150. In one embodiment, alternately applying the compressive force to hangers 150 is accomplished using a support structure from which hangers 150 suspend each of membrane modules 100. Compressing resilient spacers 502 moves adjacent envelopes 102 toward each other, as indicated by arrows 506, causing the fluid residing in each of regions 402 to flow out of each of regions 402, as indicated by arrow 508. Releasing resilient spacers 502 moves adjacent envelopes 102 away from each other and back to their original positions, as indicated by arrow 510, causing fluid to flow into each of regions 402, as indicated by arrow 512. Therefore, alternately compressing and releasing resilient spacers 502 produces an alternating flow into and out of each of regions 402. This produces flows, e.g., turbulence-induced flows, near exterior surface 140 of each of permeable membranes 108 for reducing membrane fouling and assisting in cleaning surfaces 140.

Figure 6:
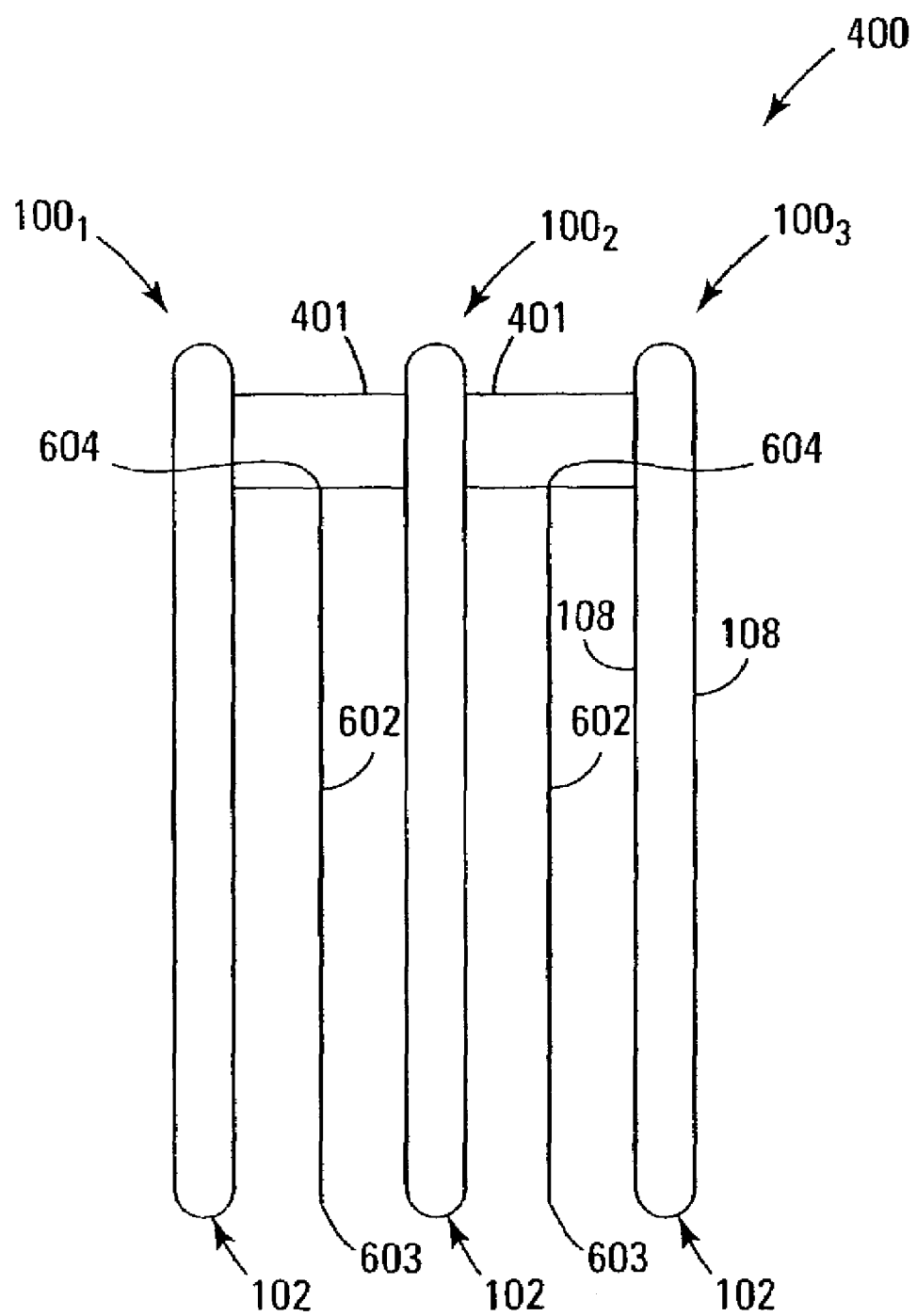
FIG. 6 illustrates yet another embodiment of a filtration apparatus according to the teachings of the present invention.

FIG. 6 illustrates another embodiment of a filtration apparatus 600 according to the teachings of the present invention. Elements in FIG. 6 that are common to FIGS. 1–4 are numbered as in FIGS. 1–4 and are as described above. A sheet 602, such as polypropylene monofilament, polyester monofilament, etc., is disposed between each of envelopes 102 of filtration apparatus 600. In some embodiments, sheet 602 has a mesh.

For one embodiment, sheet 602 is suspended between each of envelopes 102 by attaching an end 604 of sheet 602 to manifold 401. In this embodiment, an end 603 of sheet 602 located opposite of end 604 remains free. In other embodiments, sheet 602 is flexibly supported between each of envelopes 102, e.g., flexibly attached to manifold 401 by a resilient strap, spring, or the like, so that sheet 602 floats between each of envelopes 102. For these embodiments, sheet 602 can be moved between each of envelopes 102. This acts to produce turbulence, for one embodiment, that acts to reduce fouling of exterior surfaces 140 and to keep exterior surfaces 140 clean.

Figure 7:
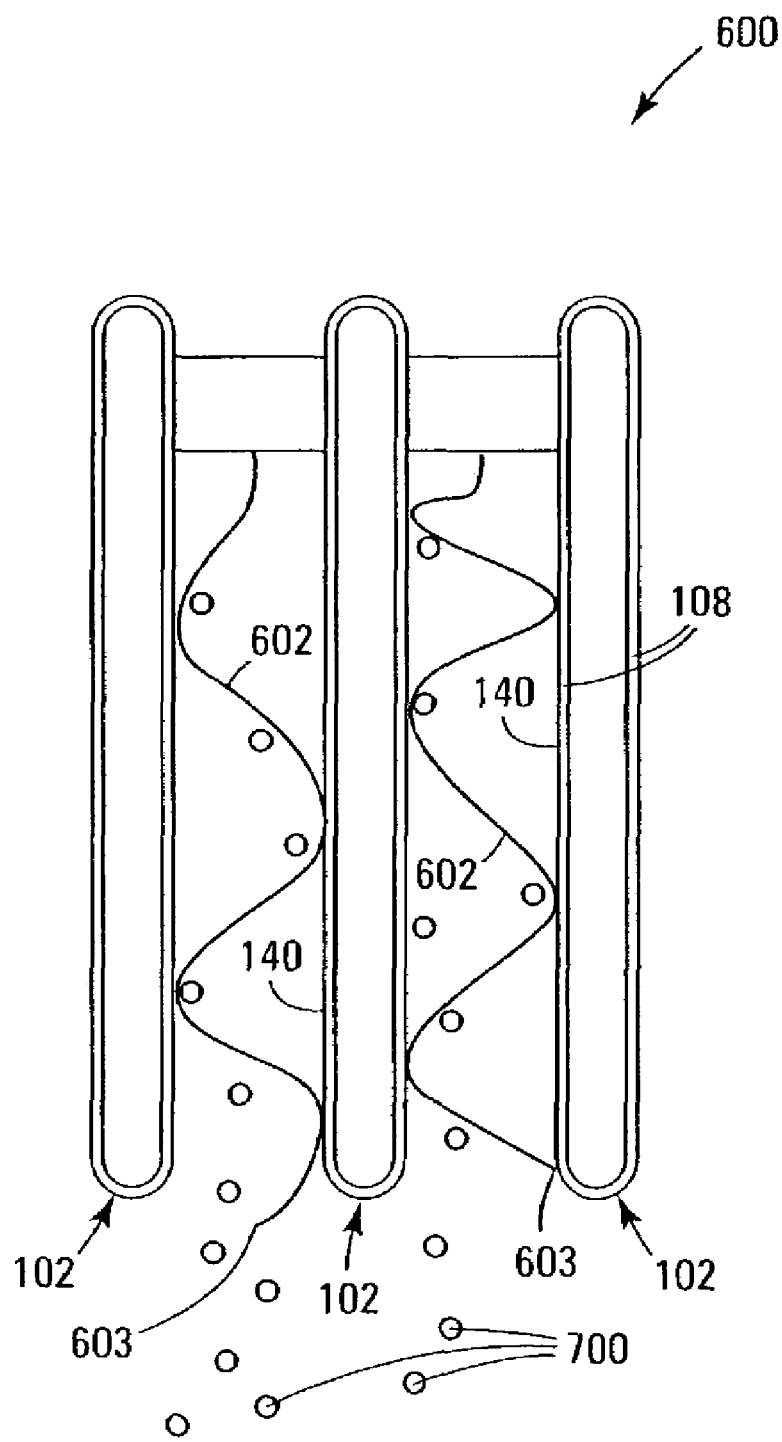
FIG. 7 illustrates an embodiment of a method for cleaning the filtration apparatus of FIG. 6.

In one embodiment, air bubbles 700, generated within the fluid in which envelopes 102 are immersed, flow between each of envelopes 102 and move sheets 602 into contact with exterior surfaces 140 of each of permeable membranes 108, as illustrated in FIG. 7. In this way, sheets 602 impart forces to exterior surfaces 140 for cleaning exterior surfaces 140. For some embodiments, air bubbles 700 move sheets 602 during backwashing. In another embodiment, sheets 602 are disposed between each of envelopes 102 of filtration apparatus 600 so as to contact exterior surfaces 140. Filtration apparatus 600 is moved, e.g., vibrated, so as to cause a scrubbing action between monofilament sheets 602 and exterior surfaces 140. For one embodiment this is performed during backwashing.

For another embodiment, sheets 602 impede the upward flow of air bubbles 700 and cause air bubbles 700 to change their course as they flow generally upward between envelopes 102. This acts to produce turbulence in the fluid between successive membranes. The turbulence acts to promote mixing adjacent exterior surfaces 140. The turbulence acts to reduce the thickness of concentration boundary layers adjacent exterior surfaces 140. This acts to reduce fouling of exterior surfaces 140 and to keep exterior surfaces 140 clean.

Figure 8:
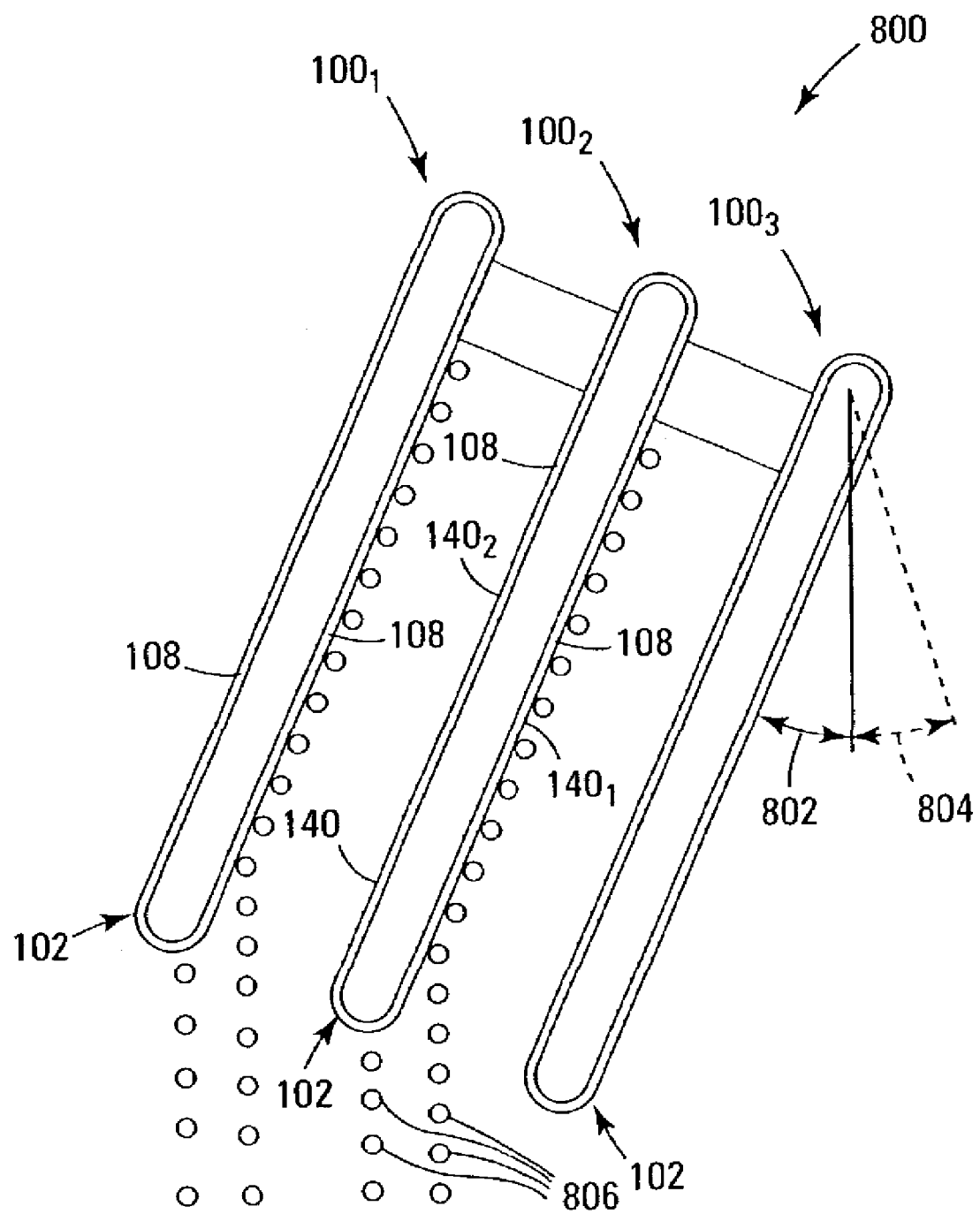
FIG. 8 illustrates an embodiment of a method for cleaning a filtration apparatus according to the teachings of the present invention.

FIG. 8 illustrates another embodiment of a filtration apparatus 800 according to the teachings of the present invention. Elements in FIG. 8 that are common to FIGS. 1–4 are numbered as in FIGS. 1–4 and are as described above. Filtration apparatus 800 is alternately positioned at angles 802 and 804 from the vertical to facilitate cleaning and/or reductions in fouling of surfaces 140, e.g., surfaces 140$_1$ and 140$_2$, of opposing permeable membranes 108 of each of envelopes 102. When filtration apparatus 800 is positioned at angle 802, surface 140$_1$ faces downward and surface 140$_2$ faces upward, as shown in FIG. 8. Alternatively, when filtration apparatus 800 is positioned at angle 804, surface 140$_2$ faces downward and surface 140$_1$ faces upward. In operation, air bubbles 806, generated within the fluid in which envelopes 102 are immersed, flow substantially vertically upward and impinge upon the downward facing surface 140, e.g., surface 140$_1$ of FIG. 8, of each of permeable membranes 108 at the angle at which apparatus 800 is positioned from the vertical, e.g., angle 802 of FIG. 8. Bubbles 806 flow along the downward facing surface 140, e.g., surface 140$_1$. This decreases the fouling rate and aids in the cleaning of the downward facing surface 140. For various embodiments, this cleaning process is performed during backwashing.

CONCLUSION

Embodiments of the present invention have been described. The embodiments provide membrane modules that eliminate the need for hollow-fiber membranes and sheet membranes that are potted within a container. Moreover, the embodiments provide a self-manifolding feature that enables a number of membrane modules to be connected together. The embodiments also provide for cleaning external surfaces of the membrane modules.

Although specific embodiments have been illustrated and described in this specification, it will be appreciated by those of ordinary skill in the art that any arrangement that is calculated to achieve the same purpose may be substituted for the specific embodiment shown. This application is intended to cover any adaptations or variations of the present invention. For example, instead of alternately compressing and releasing resilient spacers 502 of FIG. 5 to produce an alternating flow into and out of each of regions 402, alternately stretching and releasing resilient spacers 502 can respectively produce a flow into and out of each of regions 402. Moreover, alternately stretching and compressing resilient spacers 502 can respectively produce a flow into and out of each of regions 402.

What is claimed is:

1. A method of operating a filtration device having a plurality of permeable membrane modules suspended in a fluid, the method comprising:
   directing a flow of bubbles between adjacent membrane modules, each comprising an envelope bounded by a pair of permeable sheets; and
   impeding the flow of bubbles by disposing a substantially rigid sheet between the adjacent membrane modules; and attaching the rigid sheet to a manifold that interconnects the adjacent membrane modules.

2. The method of claim 1, wherein disposing a substantially rigid sheet between adjacent membrane modules comprises suspending the sheet between adjacent membrane modules so that the sheet moves between the adjacent membrane modules.

3. The method of claim 1, wherein disposing a substantially rigid sheet between adjacent membrane modules comprises contacting an exterior surface of one of the adjacent membrane modules with the sheet.

4. The method of claim 1, wherein the sheet disposed between the membrane modules comprises a mesh.

5. The method of claim 1, wherein at least one end of the substantially rigid sheet is free.

6. The method of claim 1, wherein the substantially rigid sheet is a polypropylene monofilament or a polyester monofilament sheet.

* * * * *